United States Patent [19]

Chamberlain

[11] 4,276,165

[45] Jun. 30, 1981

[54] SLUDGE SIPHON COLLECTOR WITH DE-GASING HEADER

[75] Inventor: Alan D. Chamberlain, Beaver, Pa.

[73] Assignee: Sybron Corporation, Rochester, N.Y.

[21] Appl. No.: 138,097

[22] Filed: Apr. 7, 1980

[51] Int. Cl.³ .............................................. B01D 21/24
[52] U.S. Cl. ................................ 210/242.1; 210/527; 210/539
[58] Field of Search ............... 137/131, 136, 143, 144; 210/188, 242.1, 298, 523, 524, 525, 527, 539

[56] References Cited

U.S. PATENT DOCUMENTS

| 1,851,030 | 3/1932 | Adams | 210/188 |
|---|---|---|---|
| 3,333,704 | 8/1967 | McGivern et al. | 210/527 |
| 3,669,271 | 6/1972 | McGivern | 210/242 R |
| 3,797,664 | 3/1974 | Pentz et al. | 210/527 |
| 3,997,444 | 12/1976 | McGivern | 210/242 R |
| 4,039,458 | 8/1977 | Maisonneuve et al. | 210/539 |
| 4,144,174 | 3/1979 | Graham et al. | 210/527 |

Primary Examiner—Peter A. Hruskoci
Attorney, Agent, or Firm—Roger Aceto

[57] ABSTRACT

A siphon system for a sewage settling tank or the like has a baffle fixed to the inside top surface of the collection header to prevent gas bubbles evolved from the sludge from entering the sludge inlet. An opening through the top of the header just upstream from this baffle allows the gases collected against the baffle to vent from the header and into the settling tank.

7 Claims, 5 Drawing Figures

U.S. Patent
Jun. 30, 1981
4,276,165
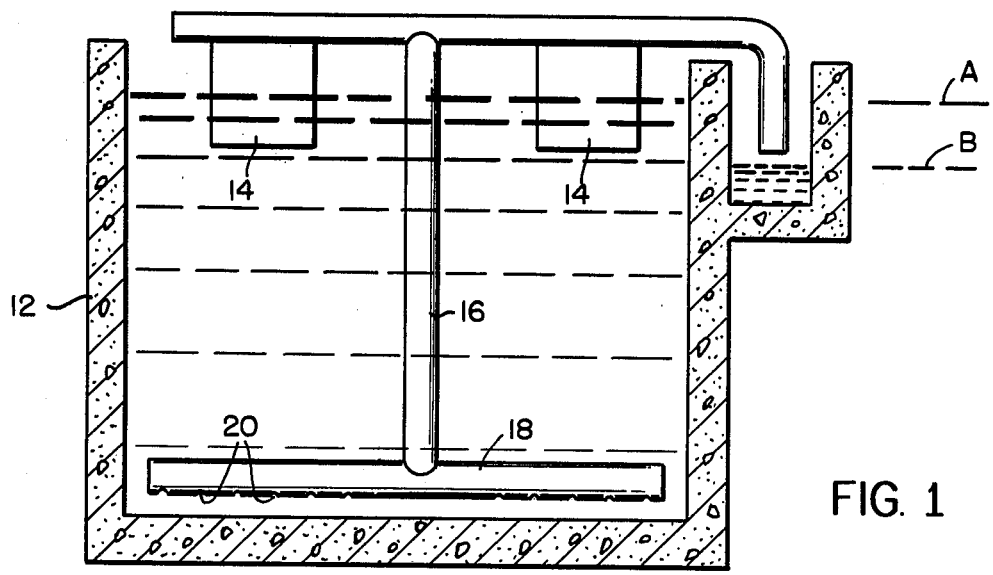
FIG. 1
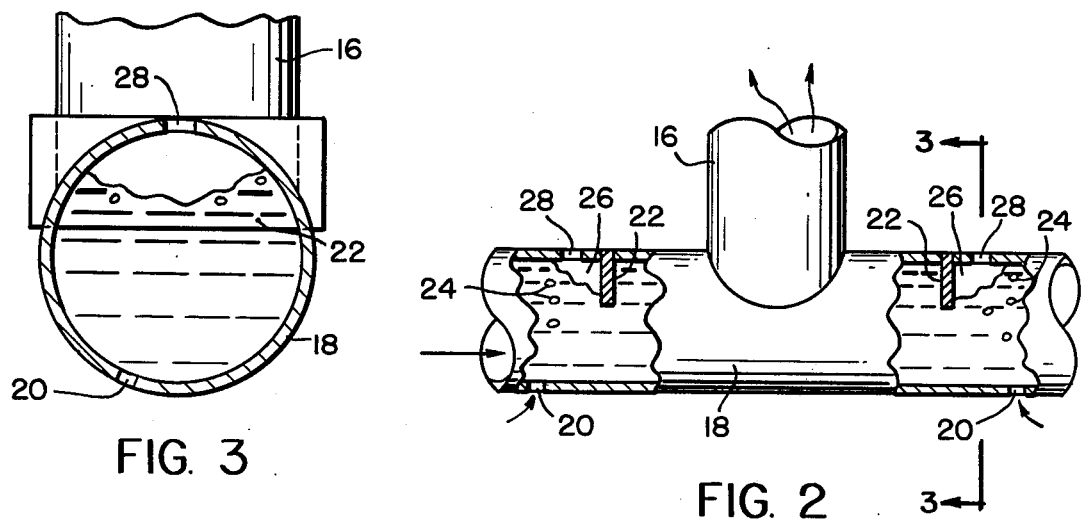
FIG. 3
FIG. 2
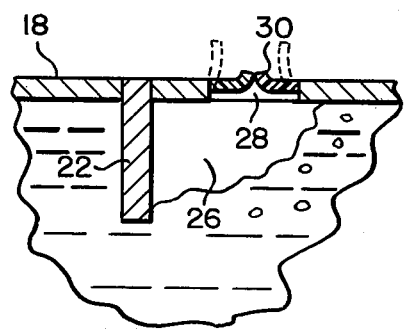
FIG. 4
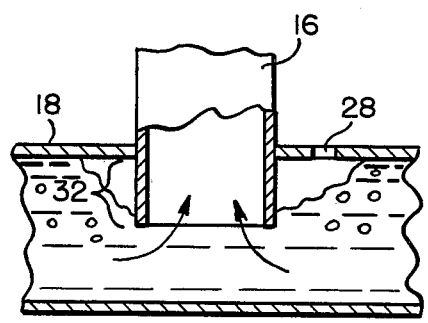
FIG. 5

SLUDGE SIPHON COLLECTOR WITH DE-GASING HEADER

BACKGROUND OF THE INVENTION

The present invention relates generally to siphon systems for use in removing sludge from the bottom of a sewage settling tank or the like. More particularly, the present invention relates to an improvement in a floating siphon system as shown generally in U.S. Pat. No. 3,333,704.

The problem in operating any siphon system is the loss of the prime due to air of other gases becoming entrapped in the siphon. This is particularly true in the case where the material being siphoned is a sewage sludge which by its nature produces a significant amount of gas. In such cases, the sewage sludge being drawn into the collection header of the siphon may liberate gas during flow into and through the header and into the siphon inlet. This liberated gas toegether with any air or gases drawn directly into the header may find its way to the inlet leg of the siphon. If a sufficient quantity of these gases are allowed to accumulate in the inlet leg a loss of prime may result in undesired down time of the siphon while the air or gas lock is removed and the siphon reprimed.

The header system of the present invention greatly reduces the amount of gas and air finding its way to the siphon inlet by providing for the collection and release of such gases directly from the collection header prior to their entry into the siphon inlet.

SUMMARY OF THE INVENTION

The present invention may be characterized in one aspect thereof, by the provision of a baffle member within the collection header of the sludge siphon, the baffle acting as a barrier to the flow of gas bubbles toward the siphon inlet. An opening in the header upstream of the baffle permits gas to vent from the header direction into the settling tank so it can bubble to the surface.

DESCRIPTION OF THE DRAWINGS

FIG. 1 is an elevation view, in section, showing a settling tank and siphon system employing the present invention;

FIG. 2 is a view on an enlarged scale partly broken away and in section showing a portion of the collection header and siphon inlet employing the present invention;

FIG. 3 is a view taken along lines 3—3 of FIG. 2;

FIG. 4 is a view partly broken away and in section showing another embodiment of the invention; and FIG. 5 is a view similar to FIG. 4 showing yet another embodiment of the present invention.

DESCRIPTION OF THE PREFERRED EMBODIMENTS

Referring to the drawings, FIG. 1 shows a sewage siphon system as modified to employ the present invention. Such a siphon system is well known in the art and its construction and operation is disclosed in detail for example in U.S. Pat. No. 3,333,704. Briefly, the system is employed in a sewage settling tank 12 and includes a floating carriage 14 which can be moved from one end of the tank to another by any suitable drive means (not shown). The carriage supports a siphon having a downwardly extending inlet leg 16. The lower end of the inlet leg communicates with a horizontal header 18 which has a plurality of spaced inlet openings 20. The header is maintained within a few inches of the bottom of the settling tank so that when the siphon is operating, the sludge, which settles to the bottom of the tank, is drawn into header 18 through openings 20, up the inlet leg 16 of the siphon and is eventually discharged into a trough 22 which extends along the side of the settling tank. The head or prime of the siphon results from a continuous fluid pathway the level of liquid in the settling tank, indicated at A, and the outlet level of the siphon, indicated at B.

As set forth hereinabove, certain types of sludge may contain a significant quantity of dissolved gas. When the sludge enters inlet openings 20, the dissolved gas may be released and forms bubbles within the collection header. Also, there may be gas bubbles entrapped in the sludge which are drawn directly into the header along with sludge. In any event, gas bubbles, whether drawn directly into the header or whether released from the sludge within the header, tend to move along with the flow of liquid into the siphon inlet 16. At the top of this inlet, the bubbles may accumulate to such an extent that the prime of the siphon is lost and the siphon ceases to function.

The present invention prevents a major portion of the gases entering the header or liberated within the header from passing into the siphon inlet leg 16. This is accomplished by collecting the gases in the header and releasing them upstream of siphon inlet leg 16. To collect the gases, FIGS. 2 and 3 show a baffle 22 extending across the top inside of header 18, upstream from inlet leg 16. Preferably, baffle 22 can be inserted through a slot cut in the top of header 18 and welded in place so that a portion of the baffle extends down from the top inside surface of the headed and into the flow path. Now, gas bubbles, as indicated by reference numeral 24, which rise to the top of header and travel along the top inside surface of the header toward inlet leg 16 responsive to the siphon action, become trapped against the upstream side of baffle 22. These gas bubbles accumulate and tend to form a gas pocket as indicated at 26.

Extending through the top of the header, on the upstream side of baffle 22, is an orifice 28. Accordingly, when the pressure in gas pocket 26 builds up to the point where it exceeds the hydraulic pressure outside of the header, the gas in pocket 26 simply bubbles through orifice 28 and rises harmlessly to the surface of the settling tank. In this manner, these gases are eliminated from the system and are kept out of the siphon inlet 16.

Depending upon the length of header 18 and the amount of dissolved gases in the particular sludge being removed from the bottom of the tank, any number of baffles 22 and orifices 28 can be provided at spaced intervals along the header. In most cases, however, it is anticipated that a pair of baffles and orifices one located on either side of inlets leg 16 as shown in FIG. 2 would be sufficient to remove enough gas to prevent loss of the prime.

In the embodiment shown in FIG. 4, orifice 28 is provided with a simple flapper valve 30. This valve would normally be in the closed position as shown in solid line to prevent fluid from entering into the header through orifice 28 during operation of the siphon. At such time as sufficient pressure has developed in gas pocket 26 to overcome the hydraulic force closing valve 30, the flapper valve will be forced open to the dotted line position allowing the gas bubble to escape.

Another manner of establishing a barrier to the passage of gas into siphon inlet 16 is shown in FIG. 5. In this embodiment, the inlet leg 16 of the siphon extends into header 18 so that the lower most portion 32 of the inlet leg defines an annular barrier. The gas flowing toward the siphon inlet leg 16 along the inside top surface of the header accumulates around inlet portion 32 and is eventually vented from the header through opening 28 as described hereinabove.

Thus, it should be appreciated that the present invention provides a degasing header for the siphon which collects and vents gas directly from the collection header before such gas can accumulate in the siphon. The barrier to the gas flow may be a simple baffle across the top inside cross section of the header or the barrier can be provided by having the siphon inlet leg 16 penetrate into the header. A simple opening on the upstream of such a baffle allows collected gases to vent harmlessly into the settling tank.

While it is appreciated that any projection into the flow path through the header may effect the head of the siphon, it has been found that the decrease in head is not so great as to equal the maximum available head represented by the difference in elevation between the level of liquid in the sewage settling tank (A) and the level of the siphon outlet (B).

I claim:

1. In a siphon system for use in removing sludge from the bottom of sewage settling tank or the like including a siphon having a vertical inlet leg extending down towards the bottom of the settling tank, the lower end of the inlet leg communicating with a generally horizontal collection header having openings at spaced intervals along the lower portion thereof for drawing sludge and the like into the horizontal header and up through the inlet leg when the siphon is operating, the improvement comprising:

(a) means associated with the upper portion of said horizontal collection header for collecting and venting gas therefrom prior to the entry of the gas into said siphon vertical inlet leg, whereby dissolved gases released from the sludge upon entry into said header is prevented from accumulating in the siphon inlet leg and destroying the prime of the siphon.

2. A siphon system as in claim 1 wherein said means includes:

(a) a baffle within said header depending from the inside top surface thereof, said baffle providing a barrier to the flow of gas bubbles through said header and into said siphon inlet leg; and (b) vent means through the top surface of said header and communicating with the upstream side of said baffle for venting from said header any gas accumulating against said baffle.

3. A siphon system as in claim 2 including a plurality of said baffles and vents means at spaced intervals along said header.

4. A siphon system as in claim 2 wherein said collection header has a slot cut through its top surface and said baffle is a plate inserted into said slot so as to extend across the top inside cross section of said collection header.

5. A siphon system as in claims 2, 3 or 4 wherein said vent means is an opening through the top of said header.

6. A siphon system as in claim 5 including a one way flapper valve for closing said opening.

7. A siphon system as in claim 2 wherein said baffle is formed by an extension of said inlet leg projecting into said header.

* * * * *